United States Patent [19]
Abe

[11] Patent Number: 5,840,442
[45] Date of Patent: Nov. 24, 1998

[54] METHOD FOR ACTIVATING AN ALKALINE RECHARGEABLE BATTERY

[75] Inventor: Hidetoshi Abe, Iwaki, Japan

[73] Assignee: Furukawa Denchi Kabushiki Kaisha, Yokohama, Japan

[21] Appl. No.: 764,319

[22] Filed: Dec. 12, 1996

[30] Foreign Application Priority Data

Dec. 19, 1995 [JP] Japan ................................. 7-330858

[51] Int. Cl.$^6$ ............................. H01M 4/24; H01M 4/26
[52] U.S. Cl. ............................. 429/206; 429/52; 429/223
[58] Field of Search ................................ 429/49, 52, 223, 429/206

[56] References Cited

U.S. PATENT DOCUMENTS

| | | | |
|---|---|---|---|
| 4,680,241 | 7/1987 | Dyer | 429/52 |
| 4,863,484 | 9/1989 | Beauchamp et al. | 429/223 |
| 5,344,728 | 9/1994 | Ovshinsky et al. | 429/223 |
| 5,405,719 | 4/1995 | Sonoda et al. | 429/223 |
| 5,506,076 | 4/1996 | Miyamoto et al. | 429/223 |
| 5,571,636 | 11/1996 | Ohta et al. | 429/223 |

FOREIGN PATENT DOCUMENTS 0 577 991 A2  1/1994  European Pat. Off. .

*Primary Examiner*—Kathryn L. Gorgos
*Assistant Examiner*—Carol Chaney
*Attorney, Agent, or Firm*—Frishauf, Holtz, Goodman, Langer & Chick, P.C.

[57] ABSTRACT

There is provided a battery activating method for an alkaline rechargeable battery, in which the capacity is not decreased even when the battery voltage is decreased by continuous load connection or self discharge. The temperature at the start of charging is set at 30° to 80° C. when activation is performed by charging the alkaline rechargeable battery having a nickel electrode, in which the powder of divalent cobalt compound, for example, CoO powder is contained in an active substance mixture, as a positive electrode.

14 Claims, No Drawings

METHOD FOR ACTIVATING AN ALKALINE RECHARGEABLE BATTERY

BACKGROUND OF THE INVENTION

1. Field of the Invention

The present invention relates to a method for activating an alkaline rechargeable battery incorporating a nickel electrode as a positive electrode prior to the actual use and, more particularly, to a method for activating an alkaline rechargeable battery, which enables the manufacture of an alkaline rechargeable battery in which a decrease in capacity does not occur and the capacity is stable even when the battery voltage is decreased by continuous load connection or self discharge.

2. Prior Art

An alkaline rechargeable battery such as a nickel-cadmium battery, nickel-hydride battery, nickel-zinc battery, and nickel-iron battery incorporates a nickel electrode as a positive electrode.

For the nickel electrode, a sintered nickel electrode and a non-sintered nickel electrode are manufactured, and the latter has been used widely in recent years because it can increase the packing density of active substance, can increase the electrode capacity, and can decrease the manufacturing cost.

This non-sintered nickel electrode, which is also called a pasted nickel electrode, is generally manufactured by the method described below.

A predetermined amount of powder of divalent cobalt compound such as CoO or $Co(OH)_2$ is mixed with $Ni(OH)_2$ powder (active substance) in which, for example, Co or Zn is solid dissolved. This mixed powder is kneaded with a sizing agent solution produced by dissolving carboxymethylcellulose or methyl cellulose in water to yield paste of active substance mixture. After a porous conductive base plate such as foam nickel plate or nickel felt is filled with this paste, drying and pressing are performed sequentially with the result that the conductive base plate supports the active substance mixture.

Then, a group of electrodes is formed by putting the nickel electrodes and predetermined negative electrodes such as a hydrogen storage alloy electrode in layers via separators, and this group of electrodes is contained in a conductive can, which also performs as a negative terminal. After a predetermined alkali electrolyte is poured in this conductive can, the whole construction is sealed, by which an intended alkaline rechargeable battery is assembled.

In the battery as is assembled, the alkali electrolyte fits poorly to the active substance, and the surface of the active substance is not activated enough to be needed for battery reaction, so that the polarization is great. Therefore, the operation voltage is lower than the specified voltage, and the rated capacity is not obtained.

For this reason, prior to the actual use, the assembled battery is charged by supplying a predetermined value of charging current to carry out battery activation. As the charging proceeds, the battery voltage is increased gradually. The charging is usually performed until the capacity reaches 140 to 160% of the rated capacity, by which the battery voltage is increased to the specified voltage.

If the battery as is assembled is once subjected to the abovementioned activation, the battery operates at the rated capacity thereafter.

At the initial stage of this activation, that is, at the initial stage of charging, when the powder of divalent cobalt compound, for example, CoO powder is contained in the active substance mixture of the nickel electrode in a dispersed state, the CoO powder behaves as follows.

First, at the contact interface between the active substance mixture and the electrolyte, a dissolution reaction of CoO with $OH^-$ in the electrolyte occurs as expressed by $$CoO + OH^- \rightarrow HCoO_2^- \tag{1}$$

so that CoO is eluted as cobalt complex ion, which is diffused.

Then, the cobalt complex ion turns to powdered cobalt oxyhydroxide by oxidation expressed by $$HCoO_2^- \rightarrow CoOOH + e^- \tag{2}$$

and the cobalt oxyhydroxide is deposited electrically in a state in which it is dispersed in the nickel electrode. In the case where the divalent cobalt compound is $Co(OH)_2$, cobalt oxyhydroxide is deposited electrically in the nickel electrode in the same way.

This cobalt oxyhydroxide is conductive. For this reason, so to call it, a conductive matrix is formed in the nickel electrode by the cobalt oxyhydroxide deposited electrically in the dispersed state. As a result, the conductivity of the whole nickel electrode is enhanced, so that the coefficient of use of active substance is increased, and the active substance behaves in an activated manner.

In order for the aforesaid activation to proceed effectively at the initial stage of charging, it is preferable for the powder of divalent cobalt compound, for example, CoO powder contained in an alkaline rechargeable battery in which a nickel electrode is incorporated as a positive electrode to be converted to complex ion rapidly based on the reaction expressed by equation (1). And also, it is preferable for abovesaid complex ion to be oxidized based on the reaction expressed by equation (2), and sequentially deposited and dispersed uniformly in the nickel electrode to form a conductive matrix.

However, the above-described series of processes do not necessarily proceed smoothly.

For example, CoO is usually used as a cobalt compound to be added to the active substance. CoO is unstable in the air, so that inactive tricobalt tetroxide ($Co_3O_4$) etc. is formed on the surface thereof, for example, when CoO is stored in the air prior to the addition, so that CoO presents a problem of poor reactivity with the electrolyte. That is, at the initial stage of charging, the dissolution expressed by equation (1) is less prone to occur, with the result that the process in which the conductive matrix is formed based on equation (2) does not proceed smoothly.

That is, the coefficient of use of CoO is not high enough for a proper conductive matrix to be formed. For this reason, in order to form a proper matrix at the initial stage of charging, it is necessary to add large amounts of expensive CoO powder to $Ni(OH)_2$ powder.

Also, when the concentration of electrolyte is in the concentration range used for the ordinary battery, cobalt oxyhydroxide yielded at the initial stage of charging has a reduction potential not higher than 0 V with respect to the potential of mercury oxide electrode (reference electrode) at room temperature.

Therefore, the following problems arise.

For example, for a nickel-hydride battery with a pasted nickel electrode as the positive electrode and a hydrogen storage alloy electrode as the negative electrode, the potential of hydrogen storage alloy electrode is about –0.9 V with respect to the potential of mercury oxide electrode.

Accordingly, if the battery voltage becomes to be a value lower than 0.9 V, cobalt oxyhydroxide is reduced.

Therefore, if the battery voltage of the nickel-hydride battery becomes to be a value lower than 0.9 V, for example, by a load connected continuously to the battery or by the self discharge thereof caused in the long-term storage, the cobalt oxyhydroxide present in the pasted nickel electrode as a conductive matrix is reduced.

And the reduced cobalt compound is converted to complex ion, moving in the electrolyte, or it is oxidized by oxygen etc. dissolved in the electrolyte into inactive tricobalt tetroxide ($Co_3O_4$). Either way, the decrease in function of conductive matrix having been formed in the nickel electrode is caused, or the conductive matrix disappears, so that the coefficient of use of active substance in the pasted nickel electrode decreases, and the polarization of the pasted nickel electrode increases.

In such a state, $\gamma$-NiOOH harmful to the battery reaction accumulates in the nickel electrode in the process of charging/discharging cycle during the actual use of battery, so that the deformation of nickel electrode or liquid exhaustion is caused, resulting in a shortened battery life.

The complex ion $HCoO_2^-$ yielded by the dissolution expressed by equation (1) has a low ionic migration velocity in the electrolyte. If a charging current having a value capable of efficient charging, for example, a charging current not lower than 0.2 C is used, the oxidation expressed by equation (2) does not proceed smoothly, and an increase in polarization is caused. As a result, the electrically deposited conductive matrix is in a dendrite form, or the surface of the conductive matrix is rough, so that the whole is of a rough shape, and the surface area is great. Also, there arises a problem in that not all the contained CoO powder is converted into a conductive matrix, and it still remains in the active substance as CoO in the process in which charging/discharging cycle is repeated during the actual use.

In particular, if the conductive matrix is of a rough shape, it is difficult for the conductive matrix to achieve sufficient collecting function, and the surface activity is increased by the increase in surface area. When the potential of the pasted nickel electrode is decreased by, for example, continuous load connection or self discharge, reduction takes place easily, leading to the halt of function or the decrease in capacity.

The aforementioned problem in that the shape of conductive matrix becomes rough arises from the following fact.

If the potential of the nickel electrode increases at the initial stage of charging, the oxidation of CoO into cobalt oxyhydroxide proceeds at an potential near 0 to 0.1 V with respect to the potential of mercury oxide electrode.

However, the polarization of the pasted nickel electrode increases, sometimes significantly exceeding the potential for oxidation into cobalt oxyhydroxide, depending on the environmental conditions at the initial stage of charging such as temperature, holding time, current density of charging current, and degree of impregnation of electrolyte into nickel electrode.

If such a phenomenon occurs, the oxidation occurs only on the surface of CoO powder, or the oxidation transfers from the oxidation of CoO to the direct oxidation of $Ni(OH)_2$, which is an active substance, so that the coefficient of use of CoO powder decreases, and further the produced oxygen gas increases, by which the shape of the electrically deposited conductive matrix is made rough.

OBJECTS AND SUMMARY OF THE INVENTION

An object of the present invention is to provide a method for activating an alkaline rechargeable battery, in which a conductive matrix of cobalt oxyhydroxide is formed in a state in which the coefficient of use of CoO powder is increased at the initial stage of charging for activating the alkaline rechargeable battery which incorporates a pasted nickel electrode containing CoO powder, and the function of the conductive matrix can be maintained even when the potential of the nickel electrode is lower than the reduction potential of nickel oxyhydroxide.

Another object of the present invention is to provide a method for activating an alkaline rechargeable battery, which can restrain the increase in battery internal pressure in activation.

To achieve the above objects, the present invention provides a method for activating an alkaline rechargeable battery, comprising a step of setting the battery temperature at the start of charging at 30° to 80° C. when activation is performed by charging the alkaline rechargeable battery having a nickel electrode, in which the powder of divalent cobalt compound is contained in an active substance mixture, as a positive electrode.

According to the activating method in accordance with the present invention, the CoO powder contained in an active substance mixture of a nickel electrode can be oxidized efficiently, and consequently the conductive matrix of cobalt oxyhydroxide can be formed in the nickel electrode uniformly in a stable state, so that the service capacity of battery can be increased.

Even if the battery voltage decreases so that the potential of the nickel electrode is lower than the reduction potential of the cobalt oxyhydroxide, the conductive matrix does not disappear or cause a decrease in function, so that the battery shows a high capacity recovery percentage. This is because the dissolution of CoO powder contained in the nickel electrode and the subsequent diffusion and oxidation proceed smoothly from the initial stage of charging since charging is started at a temperature of 30° to 80° C., so that the polarization is decreased, and a conduct matrix of cobalt oxyhydroxide having low surface activity is formed surely.

When the charging is started, a quantity of electricity of 30 to 200% of the theoretical quantity of electricity necessary for oxidizing the whole amount of divalent cobalt compound into a trivalent state is first supplied, and then the charging is continued at ordinary temperature, by which an increase in battery internal pressure can be restrained in addition to the above effects.

DETAILED DESCRIPTION OF THE INVENTION

The activating method in accordance with the present invention is characterized in that when the assembled battery is charged, the temperature of the battery when the charging is started, that is, the temperatures of all elements incorporated in the battery, such as the nickel electrode, separator, negative electrode, and alkali electrolyte, are controlled to a temperature range of 30° to 80° C.

The alkaline rechargeable battery to which the activating method of the present invention is applied may be any battery in which the powder of divalent cobalt compound is contained in the active substance mixture in the nickel electrode, which is the positive electrode.

In this case, as the divalent cobalt compound, one or two or more kinds of CoO, $Co(OH)_2$, etc. can be cited. Among these compounds, CoO is suitable because of the fact that since the weight percentage of cobalt is as high as 78.6% in this substance, when necessary moles of cobalt oxide are to be added, the amount of addition of CoO can be decreased, so that the amount of $Ni(OH)_2$ powder in the active substance mixture to be prepared can be increased.

When charging is started in this temperature range, the dissolution of CoO powder shown in equation (1) proceeds rapidly, and the dissolution rate of CoO powder increases from the initial stage of charging. Therefore, the concentration of complex ion ($HCoO_2^-$) in the nickel electrode increases in a short period of time.

Also, the ionic migration velocity of complex ion yielded based on equation (1) increases. For this reason, the oxidation expressed by equation (2) proceeds rapidly, with the result that the conductive matrix consisting of the electrically deposited cobalt oxyhydroxide is formed smoothly without an increase in polarization of nickel electrode.

Thus, the CoO powder contained in the nickel electrode is effectively utilized.

From the initial stage of charging, the concentration of complex ion ($HCoO_2^-$) in the nickel electrode is high, and the polarization of nickel electrode does not increase, so that cobalt oxyhydroxide is electrically deposited into a rather dense, smooth shape, and the formed conductive matrix does not become in a rough shape. Accordingly the surface area of the conductive matrix becomes small, so that the conductive matrix is stable in reduction.

If the temperature at the start of charging is increased to the temperature higher than 80° C., since the CoO powder of the nickel electrode dissolves surely, this high temperature is effective in the formation of conductive matrix of nickel oxyhydroxide having a smooth shape, but on the other hand, the high temperature is disadvantageous in that, for example, when the negative electrode is a hydrogen storage alloy electrode, the surface oxidation and the decrease in hydrogen storage capacity based on the surface oxidation occur, so that the activation delays, and as the charging proceeds, the battery internal pressure increases.

If the temperature at the start of charging is decreased to the temperature lower than 30° C., the formed conductive matrix has a rough shape, the potential of nickel electrode decreases, for example, when the load resistance is connected, and the reduction of conductive matrix occurs, resulting in a decrease in collecting function.

When the activating method of the present invention is carried out, a battery as is assembled is put into a constant temperature oven, whose temperature is controlled to the aforesaid temperature range, and allowed to stand for a predetermined period of time so that the battery temperature becomes a temperature in the temperature range. In this state, charging should be started.

If charging is started in the aforesaid temperature range, and charging is succeedingly continued in this temperature range for a long period of time, the battery internal pressure may be increased by the effect of the decrease in activity of negative electrode, and by the oxidation of negative electrode due to produced oxygen gas, etc.

To prevent the occurrence of these problems, it is preferable that charging be first started in the aforesaid temperature range, a quantity of electricity equivalent to 30 to 200% of the theoretical quantity of electricity necessary for oxidizing the whole amount of CoO powder contained in the nickel electrode into CoOOH (trivalent cobalt compound) be supplied, and then charging be continued by releasing the temperature control and in the state in which the whole is left at ordinary temperature.

If such a two-stage charging system is employed, the increase in battery internal pressure in the charging process is restrained, and the initial battery capacity is maintained for a long period of time.

The theoretical quantity of electricity described here is defined as the following value.

From the above-described equations (1) and (2), the following equation can be obtained.

$$CoO + OH^- \rightarrow CoOOH + e^- \quad (3)$$

That is, CoO of 1 mole is oxidized into CoOOH of 1 mole. Therefore, taking the number of moles of CoO contained in the nickel electrode as x, the theoretical quantity of electricity necessary for oxidizing CoO of x moles into trivalent cobalt compound (CoOOH) is 96485×x (coulomb) or 26.8×x (Ah).

EXAMPLES

Working examples 1 to 3, comparative examples 1 and 2

Ninety-five parts by weight of $Ni(OH)_2$ powder in which 1.0 wt % Co and 5 wt % Zn are contained as solid solution was mixed with 5 parts by weight of CoO powder. After 35 parts by weight of 1% carboxymethylcellulose solution was put in this mixture, the whole was kneaded to prepare the paste of positive electrode active substance mixture. A foam nickel plate was filled with this paste, and drying, rolling, and cutting were performed sequentially to make a pasted nickel electrode.

For one pasted nickel electrode, the theoretical quantity of electricity necessary for oxidizing the whole amount of CoO into CoOOH (trivalent cobalt) is 80 mAh.

On the other hand, a hydrogen storage alloy electrode was manufactured by the ordinary method using a $MmNi_5$ base hydrogen storage alloy in which a part of Ni of $MmNi_5$ (Mm: misch metal) is replaced by Co, Mn, Al, etc. The aforementioned pasted nickel electrode was used as a positive electrode, the aforementioned hydrogen storage alloy electrode was used as a negative electrode, and a separator made of hydrophilic polyolefin nonwoven fabric was put between them to produce a group of electrodes. After this group of electrodes was housed in a can and an electrolyte consisting mainly of KOH with a specific gravity of 1.30 was poured, the mouth of the can was sealed immediately. Thus, an AA-size nickel-hydride battery with a rated capacity of 1100 mAh was assembled.

After being assembled, the battery was allowed to stand at room temperature for five hours, and then put into a constant temperature oven having the temperature given in Table 1. The battery was allowed to stand in the constant temperature oven so that the battery internal temperature became the given temperature in Table 1. In this state, charging was started with a charging current of 0.2 C, and thereafter charging was continued until 150% of rated capacity was reached while the temperature was maintained.

For each battery having been charged, discharging was performed with a discharging current of 0.2 C until the battery voltage reaches 1.0 V, and aging was performed at a temperature of 50° C. for 24 hours.

Then, the battery characteristics of each battery were investigated on the following specification items. In any case, the environmental temperature was 20° C.

Service capacity (mAh): 150% overcharging was performed with a charging current of 0.1 C. After a half of one hour, discharging was performed with a discharging current of 0.2 C until the battery voltage reaches 1.0 V. This charging/discharging cycle was repeated. After the third cycle, the service capacity was measured.

Capacity recovery percentage (%): A resistor with a resistance value of 5 Ω was connected to each battery, and discharging was continued for 24 hours. After a half of two hours, the service capacity was measured under the same conditions as those for the measurement of the service capacity. The measured capacity value was divided by the initial service capacity, and the percentage was defined as the capacity recovery percentage.

The higher this value is, the more stable the conductive matrix of pasted nickel electrode is in the reduction.

Battery internal pressure (kg/cm$^2$): A pressure sensor was installed in each battery. Overcharging of 450% of the rated capacity was performed with a charging current of 1 C. At this time, the battery internal pressure was measured.

The lower this value is, the less the negative electrode (hydrogen storage alloy electrode) is deteriorated and the more excellent the absorption of oxygen gas is.

Residual amount of CoO: After each battery was disassembled, the pasted nickel electrode was removed, rinsed, and dried, and then the active substance layer was ground. The ground powder was classified by using a Tyler screen of 100 mesh. The X-ray diffraction pattern of the obtained powder was measured. On the resultant pattern, the area under the CoO peak appearing at a position of $2\theta=42.5°$ was determined by integration.

The larger the integrated area is, the more the residual amount of CoO is. This indicates that the dissolution does not proceed in charging and the conductive matrix is not formed sufficiently.

The above results are collectively given in Table 1.

TABLE 1

|  | Temperature at start of charging (°C.) | Battery characteristics | | | |
|---|---|---|---|---|---|
|  |  | Service capacity (mAh) | Capacity recovery percentage (%) | Battery internal pressure (kg/cm$^2$) | Integrated area of CoO peak |
| Comparative Example 1 | 20 | 1175 | 89 | 8.6 | 1505 |
| Example 1 | 30 | 1182 | 97 | 9.2 | 1025 |
| Example 2 | 50 | 1185 | 99 | 11.8 | 573 |
| Example 3 | 80 | 1172 | 100 | 13.5 | 356 |
| Comparative Example 2 | 90 | 1158 | 99 | 20.3 | 328 |

As is apparent from Table 1, as the temperature at the start of charging increases, the residual amount of CoO increases. This indicates that the compounded CoO reacts surely at high temperatures.

When the temperature at the start of charging increases, the service capacity increases accordingly, reaching a peak at a temperature of 50° C. (Working example 2), and then has a tendency of decreasing. This is probably because if the temperature at the start of charging is too high, the surface oxidation of the negative electrode (hydrogen storage alloy electrode) and the decrease in hydrogen storage capacity based on the surface oxidation occur, resulting in the delay in activation.

Further, the capacity recovery percentage of battery increases with the increase in temperature, and a high capacity recovery percentage is obtained by the charging at a temperature not lower than 30° C. At high temperatures, a conductive matrix having a smooth shape is formed surely. In Comparative example 1, however, since the temperature at the start of charging is as low as 20° C., the shape of the formed conductive matrix is rough, so that the potential of the pasted nickel electrode is decreased by the continuous discharge when the load resistance is connected, and the reduction of conductive matrix occurs, resulting in a decrease in collecting function.

On the other hand, however, as the temperature at the start of charging increases, the battery internal pressure increases, so that it is preferable to perform charging in a low temperature range from the viewpoint of restraining the increase in battery internal pressure.

Working examples 4 to 11.

As in Working examples 1 to 3, an AA-size nickel-hydride battery with a rated capacity of 1100 mAh was assembled.

The theoretical quantity of electricity necessary for oxidizing all CoO in the incorporated pasted nickel electrode into CoOOH is 80 mAh.

After being assembled, the battery was allowed to stand at room temperature for five hours, and put into a constant temperature oven with a temperature of 80° C. for one hour so that the temperature in the battery was kept at 80° C.

In this state, the quantity of electricity given in Table 2 was supplied with a charging current of 0.2 C. After the battery was removed from the constant temperature oven and allowed to stand at ordinary temperature for one hour, charging of 150% of the rated capacity was continued with a charging current of 0.2 C.

For the battery charged by the two-stage system, the battery characteristics were investigated as in working examples 1 to 3. The investigation results are collectively given in Table 2.

TABLE 2

|  | Initial power supply | | Battery characteristics | | | |
|---|---|---|---|---|---|---|
|  | Quantity of electricity (mAh) | Percentage with respect to theoretical quantity of electricity (%) | Service capacity (mAh) | Capacity recovery percentage (%) | Battery internal pressure (kg/cm$^2$) | Integrated area of CoO peak |
| Example 4 | 0 | 0 | 1180 | 90 | 9.0 | 1475 |
| Example 5 | 8 | 10 | 1182 | 93 | 9.1 | 1276 |
| Example 6 | 24 | 30 | 1184 | 98 | 9.2 | 827 |
| Example 7 | 40 | 50 | 1184 | 99 | 9.2 | 741 |
| Example 8 | 80 | 100 | 1185 | 100 | 9.3 | 388 |
| Example 9 | 160 | 200 | 1185 | 100 | 9.6 | 361 |
| Example 10 | 240 | 300 | 1183 | 100 | 10.1 | 358 |
| Example 11 | 320 | 400 | 1179 | 99 | 12.7 | 357 |

As is apparent from Table 2, in the initial stage of charging, if the quantity of electricity of 30 to 200% of the theoretical quantity of electricity necessary for oxidizing all amounts of CoO is supplied at a temperature of 80° C., the residual amount of CoO decreases, and the capacity recovery percentage shows a good value. From the viewpoint of restraining the battery internal pressure, it is found that as is apparent from the comparison between Working examples 6 to 9 in Table 2 and Working example 3 in Table 1, it is preferable to perform charging at two stages, that is, it is preferable that the charging is first performed at a high temperature, and thereafter the temperature is returned to ordinary temperature.

What is claimed is:

1. A method for activating an alkaline rechargeable battery comprising:

provided an assembled alkaline rechargeable battery comprising a positive electrode and a negative electrode, the positive electrode being prepared by mixing a divalent cobalt compound and a nickel-containing powder to form an active substance mixture, and setting the temperature of the assembled alkaline rechargeable battery at the start of charging to 30° to 80° C., when activating is being carried out, wherein the charging is performed so that a quantity of electricity of 30 to 200% of the theoretical quantity of electricity necessary for oxidizing said divalent cobalt compound into a trivalent cobalt compound is provided, and then continuing the charging such that the battery temperature is at room temperature.

2. The method for activating an alkaline rechargeable battery according to claim 1, wherein said divalent cobalt compound is at least one compound selected from a group of cobalt oxide (II) and cobalt hydroxide.

3. The method for activating an alkaline rechargeable battery according to claim 1, wherein said divalent cobalt compound is cobalt oxide (II).

4. The method for activating an alkaline rechargeable battery according to claim 1, wherein said divalent cobalt compound is cobalt hydroxide.

5. The method for activating an alkaline rechargeable battery according to claim 1, wherein the temperature of the alkaline rechargeable battery at the start of charging is 30° C.

6. The method for activating an alkaline rechargeable battery according to claim 1, wherein the temperature of the alkaline rechargeable battery at the start of charging is 50° C.

7. The method for activating an alkaline rechargeable battery according to claim 1, wherein the temperature of the alkaline rechargeable battery at the start of charging is 80° C.

8. The method for activating an alkaline rechargeable battery according to claim 1, wherein said quantity of electricity is 30% of said theoretical quantity of electricity.

9. The method for activating an alkaline rechargeable battery according to claim 1, wherein said quantity of electricity is 50% of said theoretical quantity of electricity.

10. The method for activating an alkaline rechargeable battery according to claim 1, wherein said quantity of electricity is 100% of said theoretical quantity of electricity.

11. The method for activating an alkaline rechargeable battery according to claim 1, wherein said quantity of electricity is 200% of said theoretical quantity of electricity.

12. The method for activating an alkaline rechargeable battery according to claim 11, wherein the temperature of the alkaline rechargeable battery at the start of charging is 30° C.

13. The method for activating an alkaline rechargeable battery according to claim 11, wherein the temperature of the alkaline rechargeable battery at the start of charging is 50° C.

14. The method for activating an alkaline rechargeable battery according to claim 11, wherein the temperature of the alkaline rechargeable battery at the start of charging is 80° C.

* * * * *